United States Patent
Iaculo et al.

(10) Patent No.: US 9,183,135 B2
(45) Date of Patent: Nov. 10, 2015

(54) PREPARATION OF MEMORY DEVICE FOR ACCESS USING MEMORY ACCESS TYPE INDICATOR SIGNAL

(75) Inventors: Massimo Iaculo, San Marco (IT); Ornella Vitale, Cicciano (IT); Giuseppe D'Eliseo, Caserta (IT); Danilo Caraccio, Buonalbergo (IT); Francesco Falanga, Pozzuoli (IT); Emanuele Confalonieri, Lesmo (IT)

(73) Assignee: Micron Technology, Inc., Boise, ID (US)

( * ) Notice: Subject to any disclaimer, the term of this patent is extended or adjusted under 35 U.S.C. 154(b) by 623 days.

(21) Appl. No.: 13/011,642

(22) Filed: Jan. 21, 2011

(65) Prior Publication Data

US 2012/0191924 A1    Jul. 26, 2012

(51) Int. Cl.
 G06F 12/00    (2006.01)
 G06F 13/00    (2006.01)
 G06F 13/28    (2006.01)
 G06F 12/02    (2006.01)
 G06F 13/16    (2006.01)
 G06F 21/71    (2013.01)
 G06F 21/79    (2013.01)

(52) U.S. Cl.
 CPC ........ *G06F 12/0246* (2013.01); *G06F 13/1673* (2013.01); *G06F 21/71* (2013.01); *G06F 21/79* (2013.01); *G06F 2212/7205* (2013.01); *G06F 2221/2141* (2013.01)

(58) Field of Classification Search
 CPC . G11C 11/4096; G06F 21/71; G06F 12/0246; G06F 9/30036; G06F 12/0253; G06F 3/0688; G06F 13/28; G06F 2212/222; G06F 3/0613; G06F 3/061
 USPC .................................................. 711/154, 165
 See application file for complete search history.

(56) References Cited

U.S. PATENT DOCUMENTS

| | | | | |
|---|---|---|---|---|
| 2003/0131250 A1* | 7/2003 | Quere | ............................ | 713/189 |
| 2004/0117651 A1* | 6/2004 | Little et al. | .................... | 713/200 |
| 2006/0277360 A1* | 12/2006 | Sutardja et al. | ............... | 711/113 |
| 2007/0038808 A1* | 2/2007 | Yim et al. | ..................... | 711/120 |
| 2010/0287330 A1* | 11/2010 | Su et al. | ........................ | 711/103 |

OTHER PUBLICATIONS

Jedec Standard, et al, Embedded MulitMediaCard (e MMC) e MMC/Card Product Standard, High Capacity, including Reliable Write, Boot, Sleep Modes, Dual Data Rate, Multiple Partitions Supports, Security Enhancement, Background Operation and High Priority Interrupt (MMCA, 4.41), JESD84-A441, Mar. 2010, 234 pages.

* cited by examiner

*Primary Examiner* — Charles Rones
*Assistant Examiner* — Sidney Li
(74) *Attorney, Agent, or Firm* — Knobbe, Martens, Olson & Bear, LLP

(57) ABSTRACT

Subject matter disclosed herein relates to memory devices or accessing memory devices, and more particularly, but by way of example and not limitation, to preparation of a memory device to perform a memory access operation based at least partly on at least one indicator signal that indicates a memory access type.

27 Claims, 6 Drawing Sheets

PREPARATION OF MEMORY DEVICE FOR ACCESS USING MEMORY ACCESS TYPE INDICATOR SIGNAL

BACKGROUND

1. Field

Subject matter disclosed herein relates to memory devices or accessing of memory devices, and more particularly, but by way of example and not limitation, to enabling preparation of a memory device to perform a memory access operation using a memory access command signal including at least one indicator signal that indicates a memory access type.

2. Information

Memory devices may be found in a wide range of electronic products. For example, memory devices may be used in desktop or notebook computers, tablet or slate computers, digital cameras, mobile phones, personal digital assistants (PDAs), portable entertainment devices (e.g., for audio, video, gaming, internet-accessing, etc.), or combinations thereof, etc. In electronic products, memory devices may be accessed by one or more processors in order to perform activities that are desirable to users of electronic products. Memory accesses by processors may be performed using any of many different potential approaches, which may depend, for example, at least partly on a kind of memory device being accessed. Different memory access approaches may also be implemented in accordance with, for example, respective different memory access protocols.

BRIEF DESCRIPTION OF THE FIGURES

Non-limiting and non-exhaustive aspects, features, or structures, etc. are described with reference to figures that are described below, wherein like reference numerals may refer to like parts throughout associated figures, unless context indicates otherwise.

DETAILED DESCRIPTION

Figure 1:
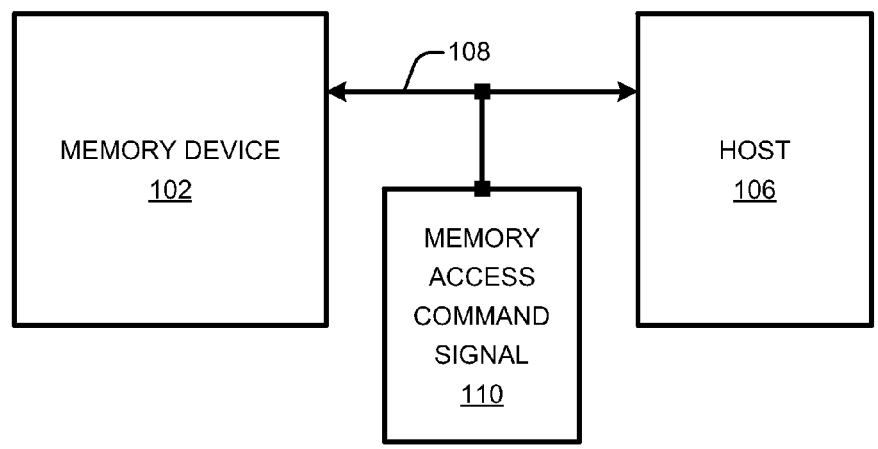
FIG. 1 is a schematic diagram of an example memory environment including a memory device and a host according to an embodiment.

Reference throughout this Specification to "a feature," "one feature," "an example," "one example," and so forth means that a particular feature, structure, characteristic, or aspect, etc. that is described in connection with a feature or example may be relevant to at least one feature or example of claimed subject matter. Thus, appearances of a phrase such as "in one example," "for example," "in one feature," "a feature," "in an example implementation," "in an example embodiment," or "for certain example embodiments," etc. in various places throughout this Specification are not necessarily all referring to the same feature, example, or example embodiment. Furthermore, particular features, examples, structures, characteristics, or aspects, etc. may be combined in one or more example devices, example methods, example systems, or other example embodiments or implementations.

So-called next generation flash NAND technology may introduce new technological characteristics. It may also offer an ability to leverage a standardized communication interface. Managed memories, which may include NAND technology, are increasingly being adopted for use in electronic products. In fact, they are becoming one of the more widely adopted memory approaches that may be implemented in various architectures of, for example, handheld or other portable systems. They may be suitable for a range of market segments. By way of example but not limitation, managed memories may be suitable for smart phone market segments, portable electronic market segments, tablet or slate market segments, hybrid computing market segments, communication product market segments, or any combination thereof, etc.

If a managed memory device is included in a given product, an example positive consequence from an overall system perspective may be that host software may be simplified. More specifically, host software to manage a flash-based device may be simplified because processes that were previously implemented by a host may instead be implemented by a managed memory device. For example, a managed memory device may implement logical-to-physical remapping, bad block management, wear leveling, power loss management, pairing page management, read disturb management, or any combination thereof, just to list a few examples.

Managed memory architectures may include non-volatile memory devices. Especially if at least some memory of a managed memory device comprises non-volatile memory, a managed memory may be used not only as pure mass storage memory, but it may also be integrated into an electronic device as part of a combined usage model (e.g., a usage model that combines code storage and data storage). Managed memories may be incorporated into systems that are intended to fulfill different end user applications or platform specifications. Examples of end user applications may include, but are not limited to, software-instructed binary digital signal allocation, databases, internet browsing, multimedia files, binary digital signal storage that is related to multimedia files, file system storage generally, or any combinations thereof, etc. Examples of platform specifications may include, but are not limited to, a specified sequential read or write bandwidth, a specified number of input/output (I/O) random operations per second, a specified power consumption, authenticated write or read accesses, specific secure commands, any combinations thereof, etc. Operating systems intending to interact with certain managed memories may expect a specified set of features so as to improve an end user experience or so as to exploit multitask paradigms or architectures.

Although managed memories may provide one or more benefits to a host or for an implementing system, their increased complexity may also precipitate inefficiencies that may retard performance. A mechanism that reduces or mitigates inefficiencies may enable a managed memory device to attain improved performance. For example, one or more indicator signals may be introduced into one or more command signals that are sent by a host to a memory device. At least one indicator signal may inform a managed memory device to prepare for a memory access operation. At least one indicator signal may inform a managed memory device that a particular memory access protocol is to be initiated by a managed memory device with respect to one or more memory content signals or one or more memory addresses of a memory access operation that is associated with an indicator signal. For example, an indicator signal may convey relevant parameters that an internal memory controller may use to enhance memory management routines. For certain example embodiments, a memory access typing mechanism may be employed to provide relevant parameters. A new command signal, an argument field signal of a command signal, another portion of a command signal or general memory communication signal, or any combination thereof, etc. may include an indicator signal that may be introduced into a set of managed memory command signals. By way of example but not limitation, a command signal or portion thereof may communicate to a memory device that an associated write or read command signal is expected to provide a specific feature, such as a result, an effect, a capability, or any combination thereof, etc.

In certain example embodiments, a host may provide to a memory device a memory access command signal that includes at least one indicator signal that indicates a memory access type for an associated memory access operation. An interface of a memory device may receive a memory access command signal that includes at least one indicator signal. A controller of a memory device may identify a memory access type of at least one indicator signal of a memory access command signal or manage a memory access of a memory array based, at least in part, on the memory access type. More specifically, a controller may manage control signals based, at least in part, on a memory access type of at least one indicator signal to prepare a memory device to perform an associated memory access operation. An indicator signal may relate, by way of example but not limitation, to providing a feature with regard to a memory access. A feature may comprise, by way of example but no limitation, a result, an effect, a capability, a behavior, or any combination thereof, etc. Example features may include, but are not limited to, boosting random writes or reads, marking memory content signals as being designated for a secure purge, assigning a classification to memory content signals, or any combination thereof, etc. Also by way of example but not limitation, an indicator signal may communicate at least one expected memory access feature that a memory device is to provide with regard to a memory access command signal, at least one characteristic corresponding to memory content signals corresponding to a memory access command signal, or any combination thereof, etc.

FIG. 1 is a schematic diagram of an example memory environment 100 including a memory device 102 and a host 106 according to an embodiment. As illustrated, memory device 102 may be coupled to host 106 via at least one communication pathway 108. For certain example embodiments, host 106 may provide a memory access command signal 110 to memory device 102 via communication pathway 108. Communication pathway 108 may be bidirectional to enable memory device 102 to provide response(s) to host 106 regarding a memory access command signal 110.

In example embodiments, host 106 may comprise at least one operating system, one or more applications or programs, at least one device driver, one or more processors, another chip or portion of chip, another device, another machine, or any combination thereof, just to name a few examples. Hence, host 106 may comprise hardware, firmware, software, etc. or any combination thereof that includes at least some hardware. Memory device 102 may comprise a standalone integrated package, a chip (e.g., a semiconductor memory chip), all or a portion of an integrated circuit, a memory module, or any combination or derivative thereof, just to name a few examples. Memory device 102 may comprise a managed memory device that is capable of performing memory management functions in addition to memory write operations or memory read operations. However, claimed subject matter is not limited to any of these particular examples for memory devices 102 or hosts 106.

Figure 2:
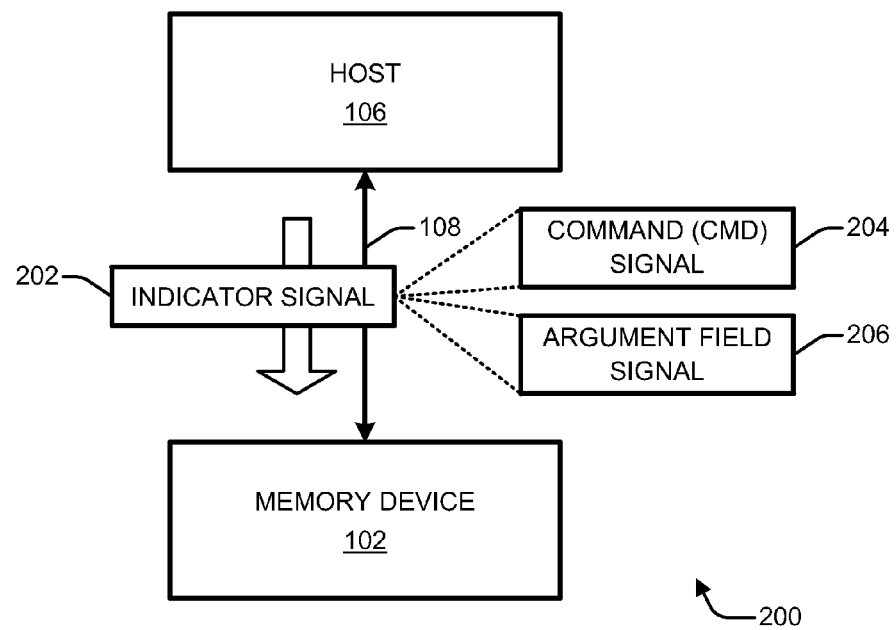
FIG. 2 is a schematic diagram of an example memory environment in which a host may provide an indicator signal to a memory device according to an embodiment, wherein an indicator signal may indicate a memory access type for an associated memory access operation.

FIG. 2 is a schematic diagram of an example memory environment 200 in which a host 106 may provide an indicator signal 202 to a memory device 102 according to an embodiment, wherein an indicator signal 202 may indicate a memory access type for an associated memory access operation. As illustrated, memory environment 200 may include memory device 102 coupled to host 106 via one or more communication pathways 108. For certain example embodiments, host 106 may provide indicator signal 202 to memory device 102 via at least one communication pathway 108. Indicator signal 202 may comprise, by way of example but not limitation, one or more binary digital signals. Binary digital signal(s) of indicator signal 202 may represent at least one alphanumeric value for a memory access type.

In example embodiments, host 106 may provide indicator signal 202 to memory device 102 as at least part of a memory access command signal 110 (e.g., of FIG. 1). Indicator signal 202 may comprise up to all or at least part of a separate command signal 204 of a memory communication signal (not shown). Separate command signal 204 may comprise a memory access command signal 110. Alternatively or additionally, indicator signal 202 may comprise up to all or at least part of an argument field signal 206 that comprises at least a portion of an entire command signal. Alternatively or additionally, indicator signal 202 may comprise up to all or a portion of a field signal other than an argument field signal of a command signal. Furthermore, an indicator signal 202 may alternatively or additionally comprise part of a payload portion of a memory communication signal between host 106 and memory device 102. By way of example, a memory access command signal may be part of one or more memory access communication signals that include memory content signals for storage or retrieval. However, claimed subject matter is not limited to any particular mode, format, arrangement, etc. of communication signals transmitted, received, or exchanged between host 106 and memory device 102.

Figure 3:
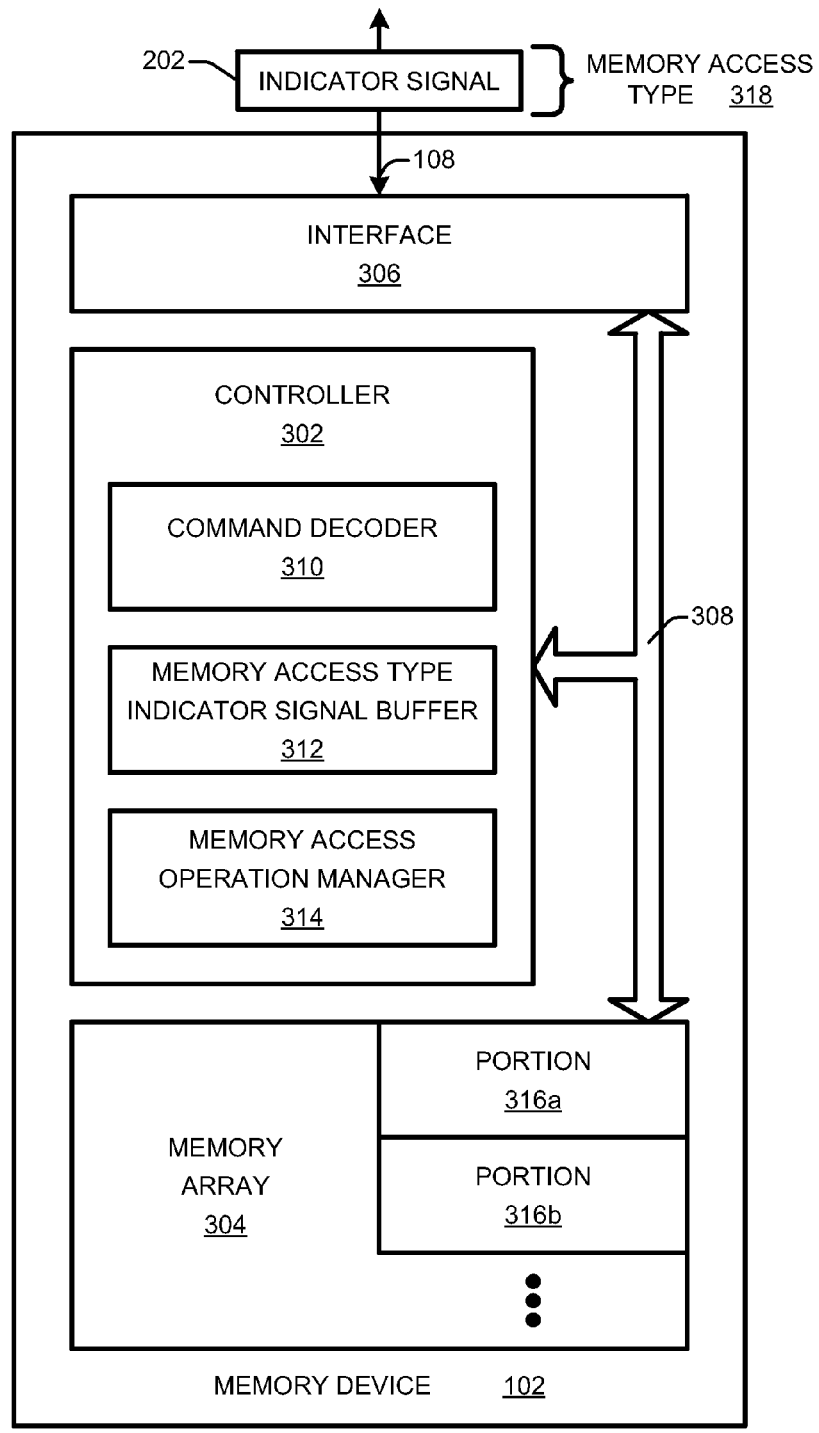
FIG. 3 is a schematic diagram of an example memory device that may operate based, at least in part, on at least one indicator signal that indicates a memory access type according to an embodiment.

FIG. 3 is a schematic diagram of an example memory device 102 that may operate based, at least in part, on at least one indicator signal 202 that indicates a memory access type 318 according to an embodiment. For certain example embodiments, memory device 102 may include any one or more of: a controller 302, a memory array 304, an interface 306, or an interconnect 308, just to name a few example components. Interface 306 may be coupled to at least one communication pathway 108 to enable memory communication signals to be transmitted between memory device 102 and at least one host 106 (e.g., of FIG. 1 or 2).

Interconnect 308 may operatively couple any two or more of at least: controller 302, memory array 304, or interface 306. Interconnect 308 may comprise, by way of example but not limitation, one or more buses, one or more wires, one or more traces, one or more links, or any combination thereof, just to name a few examples. However, claimed subject matter is not limited to any particular type, layout, or bandwidth, etc. or communication capability of an interconnect 308.

In example embodiments, interface 306 may receive a memory access command signal (e.g., a memory access command signal 110 of FIG. 1) that includes at least one indicator signal 202. Controller 302 may identify a memory access type 318 of indicator signal 202 of a received memory access command signal. Controller 302 may manage control signals based, at least in part, on an identified memory access type 318 of indicator signal 202 to prepare memory device 102 to perform a memory access operation that is associated with a memory access command signal.

In example embodiments, memory access type 318 may correspond to at least one memory access protocol. A memory access protocol may comprise, by way of example but not limitation, a feature that is to be provided with regard to a memory access operation. A feature may comprise, by way of example only, a behavior, a result, an effect, a capability, or any combination thereof, etc. Example features may include, but are not limited to, boosting random writes, boosting random reads, marking memory content signals as being designated for a secure purge, assigning a classification to memory content signals, or any combination thereof, etc. Also by way of example but not limitation, a memory access protocol may include providing an expected memory access feature with regard to a memory access operation, processing at least one characteristic corresponding to memory content signals that correspond to a memory access command signal, or any combination thereof, etc. A memory access feature may be implemented, for example, by starting, continuing, executing, or otherwise implementing a process with a controller.

For certain example embodiments, controller 302 may initiate at least one memory access protocol for memory array 304 with regard to memory content signals that correspond to a received memory access command signal based, at least in part, on memory access type 318 of indicator signal 202. A memory access protocol may be initiated by, by way of example but not limitation, activating a memory access protocol within a memory device, providing at least one feature of a memory access protocol to an external host, or any combination thereof, etc. Controller 302 may comprise, for example, a managed memory controller that is capable of accessing memory array 304 or responding to a host via interface 306 in a manner or manners to implement one or more different memory access protocols. Multiple different non-exhaustive and non-limiting examples of memory access protocols are described herein below.

In example embodiments, memory array 304 may be operatively coupled to controller 302 via, for example, interconnect 308. Memory array 304 may write or store memory content signals responsive to command signals issued by controller 302. Additionally or alternatively, memory array 304 may enable memory content signals to be read or retrieved responsive to command signals issued by controller 302. Memory array 304 may comprise one or more portions 316, such as a portion 316a or a portion 316b. Hence, at least part of memory array 304 may be partitioned into multiple portions 316. If there are multiple portions 316, different portions 316 (e.g., portion 316a or portion 316b) may correspond to different memory access types 318. For instance, memory content signals associated with a particular memory access type may be accessed from a portion 316 that corresponds to that particular memory access type. However, claimed subject matter is not limited to portions 316 that correspond to memory access types. Although two portions 316 are shown, a given memory array 304 may alternatively include more or fewer such portions 316. Moreover, a given memory array 304 may not include a separately identifiable portion 316, or it may comprise a single homogenous portion 316. However, claimed subject matter is not limited to any of these specific examples for portions or arrangements of portions for a memory array 304.

In example embodiments, controller 302 may be operatively coupled to at least one of memory array 304 or interface 306. Controller 302 may include a command decoder 310, a memory access type indicator signal buffer 312, a memory access operation manager 314, or any combination thereof, just to name a few example components. However, claimed subject matter is not so limited. For example, one or more components may not be included in certain implementations, or one or more illustrated components may be part of different component(s) of a memory device. For example, a command decoder 310 may alternatively be part of an interface 306 or may be a separate component of a memory device 102. A memory access type indicator signal buffer 312 may instead be part of an interface 306 or may be a separate component of memory device 102. A memory access operation manager 314 may instead be associated with memory array 304, may include or be associated with memory access type indicator signal buffer 312, or may be a separate component of memory device 102. As another example alternative, one or more components may be integrated or otherwise incorporated together. Still other alternative embodiments may be implemented in accordance with claimed subject matter.

In example embodiments, memory access type indicator signal buffer 312 may store one or more binary digital signals comprising at least part of indicator signal 202 or a derivative signal of indicator signal 202. A derivative signal of indicator signal 202 may result from decoding, translating, etc. indicator signal 202; may comprise a portion of indicator signal 202; may comprise a modified version of indicator signal 202; or any combination thereof; etc. Controller 302 may manage signals controlling a memory access operation directed to memory array 304 using contents of memory access type indicator signal buffer 312.

In other example embodiments, command decoder 310 may decode a memory access command signal or extract at least one indicator signal 202 from a memory access command signal to identify a memory access type 318. Additionally or alternatively, memory access operation manager 314 may translate at least part of a memory access command signal that includes an indicator signal 202 into a sequence of command signals (not shown). Memory access operation manager 314 may further issue a sequence of command signals to memory array 304 to cause memory array 304 to read or write memory content signals for an associated memory access operation in accordance with a memory access command signal or memory access protocol. Memory access operation manager 314 may also or alternatively issue a sequence of command signals to memory array 304 to prepare memory array 304 for a memory access operation in accordance with memory access type 318 of indicator signal 202.

For certain example embodiments, different memory access protocols may correspond to different features or processes that a memory controller of memory device 102 is to implement based at least partly on a memory access type of an indicator signal. Additionally or alternatively, certain example embodiments may pertain to different portions 316 of memory device 102 corresponding to different memory access protocols. Although other examples of different memory access protocols are described further herein below, different memory access protocols may therefore correspond to different kinds of memories or memories having different characteristics. Different portions 316 may correspond to different kinds of memories or memories having different characteristics. Example memory characteristics may include, but are not limited to, different costs per bit, different materials or manufacturing techniques, different areas per bit, different control management capabilities, different performance levels, or any combination thereof, etc. Additional examples of different memory characteristics may include, but are not limited to, different levels of reliability, different levels of speed of access, different levels of longevity, different modes of access (e.g., sequential versus random), different levels of cost tradeoffs, different levels of security, or any combinations thereof, etc. Different kinds of memories may include, but are not limited to, phase-change memory (PCM), flash memory, single-level cell (SLC) flash memory, multi-level cell (MLC) flash memory, NOR-based memory, NAND-based memory, other non-volatile kinds of memories, volatile kinds of memory, or any combinations thereof, etc. However, claimed subject matter is not limited to any particular kinds of memories or memory characteristics.

For certain example embodiments, as noted above, memory device 102 may be capable of initiating one or more memory access protocols. Memory access protocols, or operations corresponding thereto, may be requested of a memory device 102 by a host 106. A non-limiting and non-exhaustive list of example memory access protocols is provided below. However, claimed subject matter is not limited to any particular memory access protocol or to any specific example implementations described below.

An example of a memory access protocol may comprise a random access boost. For example, a random access boost may comprise a random write access boost or random read access boost. In an example embodiment, a memory access type of an indicator signal may inform a memory device that a next write access command signal includes one or more random accesses so that controller 302 may set up, institute, or activate processes to execute in an efficient manner a data program write operation over multiple random addresses. Random accesses may comprise accesses that are scattered across a range of logical block addresses. An access may be efficient in terms of time or energy, just to name a couple of examples. Alternatively or additionally, a memory access type of an indicator signal may inform a memory device that a read access operation is to be performed as quickly as possible. However, claimed subject matter is not limited to any particular random access embodiments, including any particular random write access or random read access implementations.

Another example of a memory access protocol may comprise indication(s) that memory content signals are to be purged by secure commands. In an example embodiment, a memory access type of an indicator signal may inform a memory device that memory content signals to be written are to be marked as 'secure' or designated for secure purging in lieu of erasing. Thus, if physical locations in which memory content signals are being written have to be subsequently erased for, e.g., a defragmentation or a wear leveling operation, memory content signals may not be simply 'erased' using, for example, a NAND flash erase command. Instead, 'secure' memory content signals are to be securely 'purged'.

By way of example only, memory content signals may be securely purged if purged memory content signals cannot be recovered from a memory device using read operation(s). An example defined procedure is set forth in a JESD84-A441 specification. An indicator signal that includes a 'secure write' memory access type may also enable a controller to implement a given approach to storing memory content signals in terms of physical address organization. Secure memory content signals may be stored, for example, into dedicated blocks or portions that are not shared with non-secure memory content signals. Consequently, defragmentation operations for non-secure memory content signals may be less affected by time periods consumed by secure purging. However, claimed subject matter is not limited to any particular secure write embodiments, such as example tagging-for-purging memory access implementations.

Another memory access protocol example may comprise classifying memory content signals to be stored, which classifications may have an associated reliability for example. In an example embodiment, a memory access type of an indicator signal may specify a classification of memory content signals to be accessed with a read operation or a write operation. Examples of classifications may include, but are not limited to, file system signals, multimedia content signals, operating system code signals, software application source code signals, or any combination thereof, etc. A controller may locate or relocate classified memory content signals in physical media accordingly. For instance, source code signals may be assigned to a memory technology that provides for read endurance (e.g., PCM). File system signals may be assigned to a memory technology that provides for reliability (e.g., NAND blocks used in an SLC mode (instead of an MLC mode)). Indicator signals including a memory access type may also be employed in hybrid architectures that implement buffering or caching processes. However, claimed subject matter is not limited to any particular memory content signal classification embodiments, such as example memory access classification implementations. Furthermore, claimed subject matter is not limited to any particular memory technologies.

Figure 4:
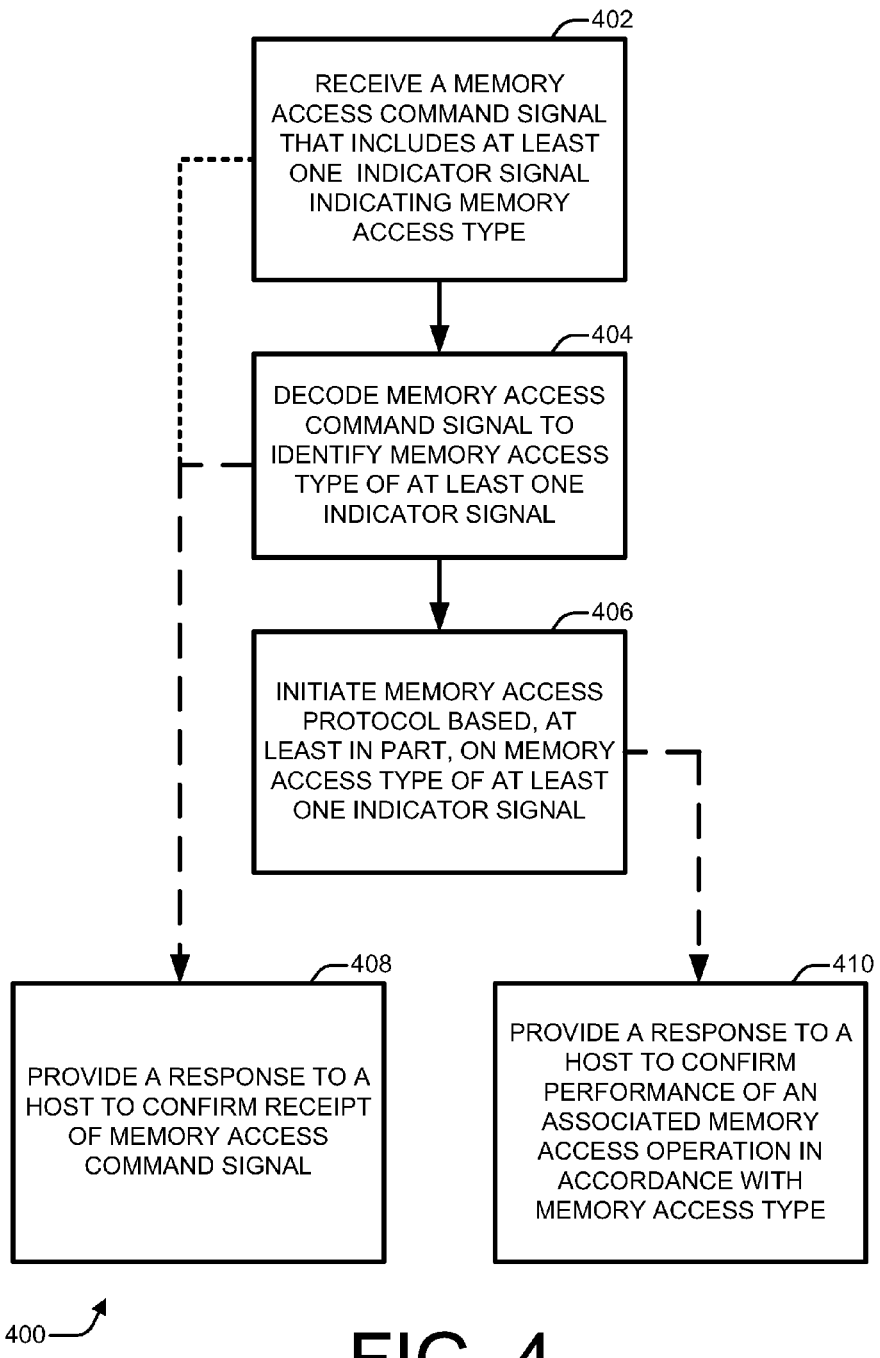
FIG. 4 is a flow diagram illustrating an example method for a memory device that may effectuate a memory access based, at least in part, on at least one indicator signal that indicates a memory access type according to an embodiment.

FIG. 4 is a flow diagram 400 illustrating an example method for a memory device that may effectuate a memory access based, at least in part, on at least one indicator signal that indicates a memory access type according to an embodiment. As illustrated, flow diagram 400 may include any of operational blocks 402-410. Although operations 402-410 are shown and described in a particular order, it should be understood that methods may be performed in alternative manners without departing from claimed subject matter, including but not limited to with a different order or number of operations. Also, at least some operations of flow diagram 400 may be performed so as to be fully or partially overlapping with other operation(s). Additionally, although the description below references particular aspects or features illustrated in certain other figures (e.g., FIGS. 1-3), methods may be performed with other aspects or features.

For certain example embodiments, one or more of operations 402-410 may be performed at least partially by at least one memory device 102 that is in communication with at least one host 106. At operation 402, a memory access command signal that includes at least one indicator signal indicating a memory access type may be received at an interface of a memory device. For example, a memory access command signal 110 that includes at least one indicator signal 202 indicating a memory access type 318 may be received at an interface 306 of a memory device 102.

At operation 404, a memory access command signal may be decoded at a controller of a memory device to identify a memory access type of an indicator signal. For example, memory access command signal 110 may be decoded at a controller 302 of memory device 102 to identify a memory access type 318 of at least one indicator signal 202.

At operation 406, a memory access protocol of a memory device may be initiated based, at least in part, on a memory access type of at least one indicator signal. For example, a memory access protocol of a memory device 102 may be initiated based, at least in part, on a memory access type 318 of at least one indicator signal 202. Although not explicitly shown in flow diagram 400, an operation may include receiving memory content signals that correspond to a memory access command signal or a memory access operation. Memory content signals may be received during any portion of a method of flowchart 400. By way of example but not limitation, memory content signals that correspond to a memory access command signal may be received before, during, or after performance of operation 402. Memory content signals that correspond to a memory access command signal may also or alternatively be received prior to beginning performance of operation 410.

Receipt of a memory access command signal (e.g., as part of operation 402) may comprise, for example, receiving a memory access command signal from a host at an interface of a memory device. If so, at operation 408, a response to a host to confirm that a memory access command signal has been received or decoded may be provided. For example, if a memory device 102 receives a memory access command signal 110 from a host 106, memory device 102 may provide to host 106 a confirmation of receipt or decoding of memory access command signal 110. By way of example but not limitation, operation 408 may occur after operation 402 may have been completed or after operation 404 may have at least been initiated, but before operation 406 may be started or completed.

Additionally or alternatively, a response may be provided to a host after a received memory access command signal has been performed. For example, at operation 410, a response may be provided to a host to confirm that a memory access command signal has been performed in accordance with a memory access type of at least one indicator signal. For example, if a memory device 102 receives a memory access command signal 110 from a host 106, upon or after completion of a requested memory access operation, memory device 102 may provide to host 106 a confirmation of performance of a memory access operation in accordance with a memory access type 318 of at least one indicator signal 202. By way of example but not limitation, operation 410 may occur after operation 406 has been completed or after any preparations associated with performing operation 406 have been completed.

In example embodiments, a memory device may attempt and fail to decode a received memory access command signal or may otherwise determine that at least a memory access type of an indicator signal that is included as at least a part thereof cannot be processed. For instance, a memory access type may be incorrectly formatted. If a memory access type of an indicator signal cannot be processed, a memory device may generate an error message or communicate an error message to a host to indicate that a received a memory access type of an indicator signal was not correctly decoded.

In example embodiments, a memory access type of at least one indicator signal may correspond to at least one memory access protocol for a memory device. A method may further comprise initiating at least one memory access protocol for a memory device with regard to memory content signals that correspond to a received memory access command signal based, at least partly, on a memory access type of at least one indicator signal.

In example embodiments, a method may further comprise translating at least part of a memory access command signal into a sequence of command signals or issuing a sequence of command signals to a memory array of a memory device to cause an associated memory access operation to be performed in accordance with a memory access protocol.

In other example embodiments, a memory device may be prepared for a memory access operation by initiating a memory access protocol based, at least in part, on a memory access type of at least one indicator signal in any one or more of a number of different manners. For example, initiation of a memory access protocol may comprise preparing to mark memory content signals, which may correspond to an associated memory access operation, as being designated to be securely purged in lieu of erased in accordance with a memory access type of at least one indicator signal. As an alternative or additional example, initiation of a memory access protocol may comprise preparing to store memory content signals, which may correspond to an associated memory access operation, in at least one portion of a memory array, with the at least one portion of the memory array corresponding to a particular performance level in accordance with a memory access type of at least one indicator signal. As an alternative or additional example, initiation of a memory access protocol may comprise preparing to expedite performance of an associated memory access operation with a memory array in accordance with a memory access type of at least one indicator signal.

Figure 5:
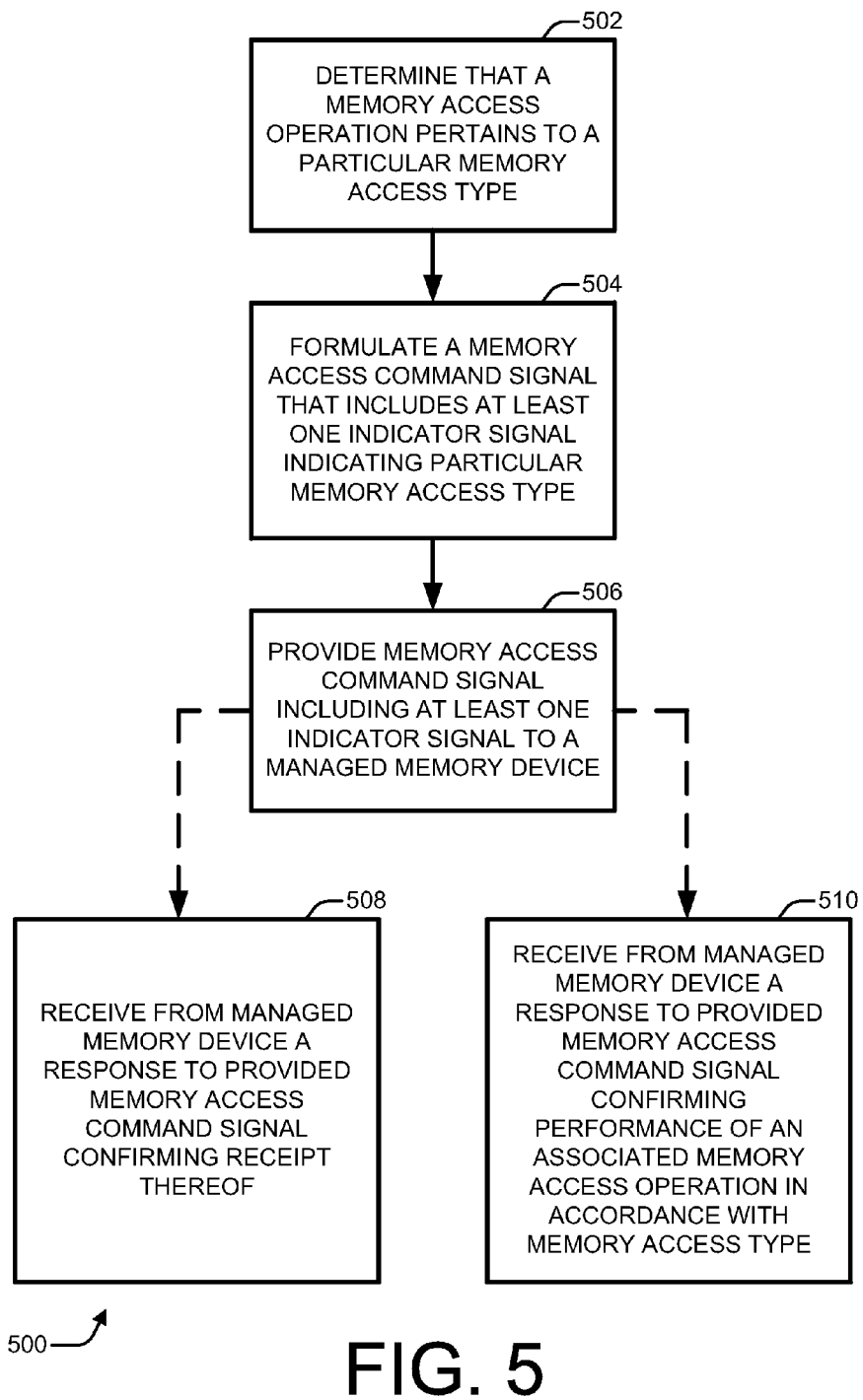
FIG. 5 is a flow diagram illustrating an example method for a host that may effectuate a memory access based, at least in part, on at least one indicator signal that indicates a memory access type according to an embodiment.

FIG. 5 is a flow diagram 500 illustrating an example method for a host that may effectuate a memory access based, at least in part, on at least one indicator signal that indicates a memory access type according to an embodiment. As illustrated, flow diagram 500 may include any of operational blocks 502-510. Although operations 502-510 are shown and described in a particular order, it should be understood that methods may be performed in alternative manners without departing from claimed subject matter, including but not limited to with a different order or number of operations. Also, at least some operations of flow diagram 500 may be performed so as to be fully or partially overlapping with other operation(s). Additionally, although the description below references particular aspects or features illustrated in certain other figures, methods may be performed with other aspects or features.

For certain example embodiments, operations 502-510 may be performed at least partially by at least one host 106 that is in communication with at least one memory device 102. At operation 502, a host may determine that a desired memory access operation pertains to at least one particular memory access type. At operation 504, a host may formulate a memory access command signal that includes at least one indicator signal indicating a particular memory access type corresponding to at least one desired memory access operation. For example, a host 106 may formulate a memory access command signal 110 that includes at least one indicator signal 202 indicating a memory access type 318 that corresponds to at least one particular memory access type pertaining to a desired memory access operation.

At operation 506, a host may provide a memory access command signal including at least one indicator signal indicating a memory access type to a managed memory device. For example, host 106 may provide memory access command signal 110, which includes at least one indicator signal 202 indicating a memory access type 318, to a managed memory implementation of a memory device 102 via at least one communication pathway 108. Although not explicitly shown in flow diagram 500, an operation may include providing memory content signals that correspond to a memory access command signal from a host to a memory device. Memory content signals may be provided to a memory device during any portion of a method of flowchart 500. By way of example but not limitation, memory content signals that correspond to a memory access command signal may be provided during at least a portion of operation 506 or after performance of operation 506.

At operation 508, a host may receive from a managed memory device a response to a provided memory access command signal confirming receipt of the memory access command signal. For example, host 106 may receive from memory device 102 via at least one communication pathway 108 a confirmation that memory access command signal 110 has been received at memory device 102. Additionally or alternatively, at operation 510, a host may receive from a managed memory device a response to a provided memory access command signal confirming performance of an associated memory access operation in accordance with a memory access type of at least one indicator signal. For example, host 106 may receive from memory device 102 via at least one communication pathway 108 a confirmation that an associated memory access operation for a provided memory access command signal 110 has been performed in accordance with a memory access type 318 of at least one indicator signal 202. By way of example but not limitation, operation 508 or operation 510 may occur after operation 506 has been completed.

Figure 6:
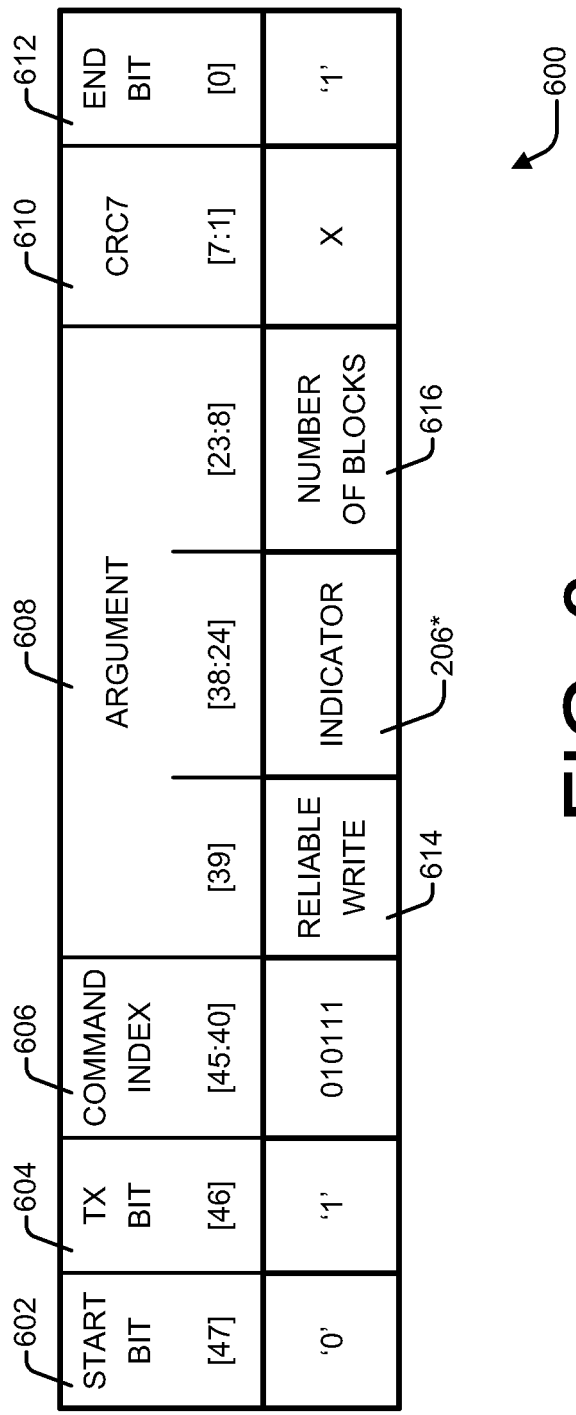
FIG. 6 is a block diagram of an example format arrangement for binary digital signals for a memory access command signal that may include binary digital signals for an argument field that may comprise at least one indicator signal indicating a memory access type according to an embodiment.

FIG. 6 is a block diagram of an example format arrangement 600 for binary digital signals for a memory access command signal that may include binary digital signals for an argument field 608 that may comprise at least one indicator signal indicating a memory access type according to an embodiment. As noted above, for certain example embodiments, an indicator signal 202 (e.g., of FIG. 2 or 3) may comprise at least part of an argument field signal 206 (e.g., of FIG. 2). An example implementation for a command argument field embodiment is shown as format arrangement 600 of FIG. 6 with an indicator segment 206*.

In example embodiments, and as illustrated in FIG. 6, example format arrangement 600 may include 48 bits [47:0]. It should be understood that "bit" or "bits" terminology may be used herein to represent at least one binary digital signal. Hence, fields or segments of format 600 may comprise one or more binary digital signals. Format 600 may include, by way of example but not limitation, any one or more of six (6) different fields 602-612: a start bit field 602, a transmission bit field 604, a command index field 606, an argument field 608, a cyclic redundancy check-7 (CRC7) field 610, and an end bit field 612. Start bit field 602 may comprise bit [47], and transmission bit field 604 may comprise bit [46]. Command index field 606 may comprise bits [45:40], and argument field 608 may comprise bits [39:8]. CRC7 field 610 may comprise bits [7:1], and end bit field 612 may comprise bit [0]. However, claimed subject matter is not limited to any particular number of bits, number of fields, field assignments, field bit lengths, or field orders, etc.

For certain example embodiments, argument field 608 may comprise one or more segments formed from at least a portion of its 32 bits [39:8]. "Segment," as used herein, may refer to at least a portion of a field, such as an argument field 608. Argument field 608 may include, by way of example but not limitation, one or more of three (3) different segments 614, 206*, or 616: a reliable write segment 614, an indicator segment 206*, or a number of blocks segment 616, etc. Reliable write segment 614 may comprise bit [39]. Indicator segment 206* may comprise 15 bits [38:24]. Number of blocks segment 616 may comprise 16 bits [23:8]. As shown by way of example but not limitation, reliable write segment 614 may be adjacent to indicator segment 206*. Reliable write segment 614 may be adjacent to indicator segment 206* in terms of time or frequency, etc. Indicator segment 206* may comprise at least one indicator signal 202 (e.g., of FIG. 2 or 3) that indicates a memory access type 318 (e.g., of FIG. 3). Indicator segment 206* may be considered to comprise a tag for a memory operation. Contents of indicator segment 206* may, for example, inform a memory device that an associated memory access operation may be issued for a specific operation or purpose so that a feature may be implemented by a memory device or provided to a host. However, claimed subject matter is not limited to any particular location, bit-length, timing, etc. for indicator segment 206*. Furthermore, claimed subject matter is not limited to any particular formulation of argument field 608. For example, an argument field 608 may include more or fewer segments than three. Also, one or more segments of argument field 608 may have different lengths, different orders, or different purposes, etc. from each other or from those that are illustrated in FIG. 6 or described herein.

For certain example embodiments, format arrangement 600 may be used for a memory access command signal to access a managed memory device. More specifically, but by way of example only, format arrangement 600 may be used in a context of accessing data with an embedded multimedia card (eMMC). Still more specifically, but by way of example only, format arrangement 600 may be used in a context of an eMMC 4.41 command set that comports with a Joint Electron Device Engineering Council (JEDEC) (also known as JEDEC Solid State Technology Association) specification, such as JESD84-A441. Even still more specifically, format arrangement 600 may be used in a context of a CMD23 command of a JEDEC specification. However, claimed subject matter is not limited to any of these specific implementation examples. An indicator segment 206* may comprise, for example, at least part of a different field of a memory access command signal. Additionally or alternatively, an indicator segment 206* may comprise, for example, a field of a memory access command signal that is not shared with another segment. Furthermore, memory access type indication implementations, approaches, or mechanisms, etc. that are described herein may be adapted or adopted for use in other memory protocols, including but not limited to other standardized managed memory protocols.

For certain example embodiments, at least one memory device may be operatively coupled with one or more processing units in a system. In other words, a system may include at least one memory device and at least one processing unit. A memory device may include a controller and an interface, with an interface to receive a memory access command signal that includes at least one indicator signal indicating a memory access type. A controller may identify a memory access type of at least one indicator signal of a memory access command signal. A controller may manage control signals based, at least in part, on a memory access type of at least one indicator signal to initiate a memory access protocol to prepare a memory device to perform an associated memory access operation. A processing unit may host one or more applications or initiate a provision of memory access command signals to an interface of a memory device to enable access to the memory device.

In example embodiments, a system may comprise a mobile device, and a memory device may include a memory array. At least part of a memory array may be partitioned into at least a first portion and a second portion. A first portion may have a relatively higher performance than a second portion, and the second portion may have a relatively higher density than the first portion. For instance, a processing unit may assign memory content signals that are associated with operation of an operating system to a relatively higher performing first portion. Or a processing unit may assign memory content signals that are associated with media content to a relatively higher density of a second portion. Performance of a memory portion may be higher, by way of example but not limitation, if accessing of memory content signals is faster. Density of a memory portion may be higher, by way of example but not limitation, if an amount of memory content signals that may be stored in a given area or volume is greater. By way of example but not limitation, a first portion may comprise an SLC memory area, or a second portion may comprise an MLC memory area. However, claimed subject matter is not limited to any particular number of memory portions, performance or density of memory portions, or kinds of memory portions, etc.

Figure 7:
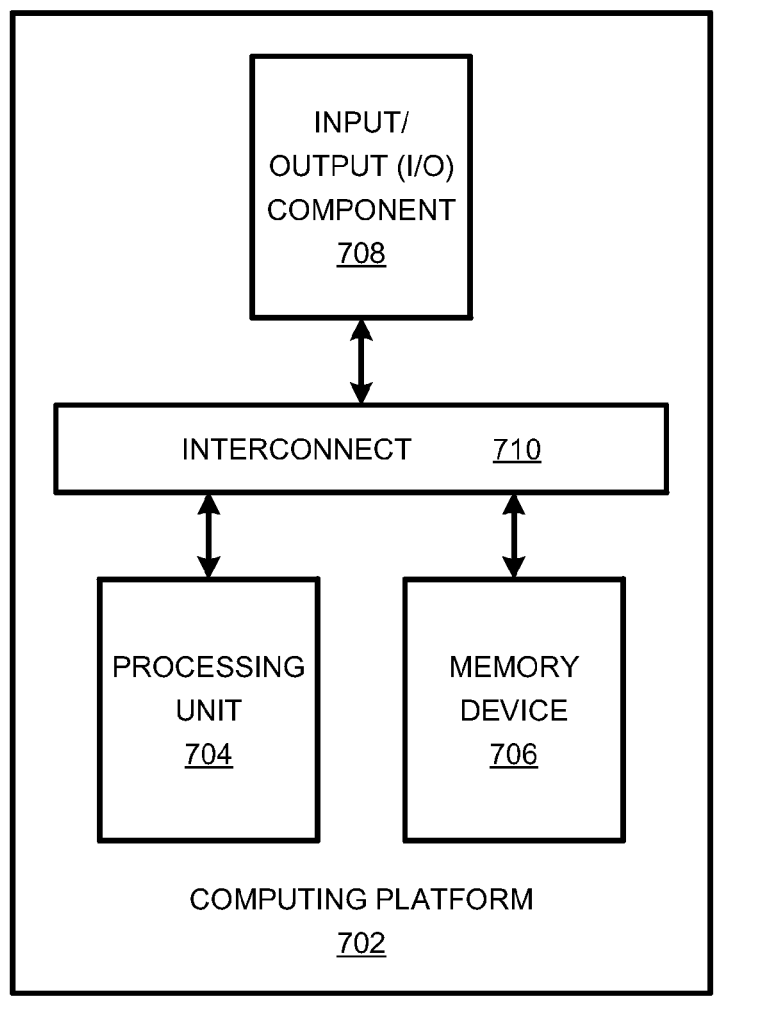
FIG. 7 is a schematic diagram illustrating an example system that may implement one or more aspects for preparation of a memory device for access based at least partly on at least one indicator signal that indicates a memory access type according to an embodiment.

FIG. 7 is a schematic diagram illustrating an example system 700 that may implement one or more aspects for preparation of a memory device for a memory access based at least partly on at least one indicator signal that indicates a memory access type according to an embodiment. It should be understood, however, that claimed subject matter is not limited to any particular features, aspects, organizations, or components, etc. or other implementations described herein below with regard to example embodiments of system 700. As illustrated, system 700 may comprise at least one computing platform 702 that may include one or more processing units 704, at least one memory device 706, at least one input/output I/O component 708, or at least one interconnect 710.

A computing platform 702 may comprise any apparatus that may include or be capable of interacting with a memory device 706. Computing platform 702 may comprise, for example, any apparatus having at least one processing unit 704 or at least one memory device 706. A processing unit 704 may include or execute an operating system, an application, a program, other code, or any combination thereof, just to name a few examples. Memory device 706 may comprise an example of a memory device 102 (e.g., of FIGS. 1-3). With computing platform 702, a processing unit 704, a memory device 706, or an I/O component 708 may be operatively coupled together or interconnected by interconnect 710. Signals related to memory communications may be sent, for example, between processing unit 704 and memory device 706 via interconnect 710.

By way of example but not limitation, processing unit 704 may comprise one or more processors, controllers, microprocessors, microcontrollers, application specific integrated circuits (ASICs), digital signal processors (DSPs), programmable logic devices, field programmable gate arrays (FPGAs), or any combination thereof, etc. By way of example but not limitation, an I/O component 708 may comprise one or more devices or features that enable human or machine input signals to be accepted or that enable human or machine output signals to be produced. By way of example but not limitation, an interconnect 710 may comprise one or more buses, wires, traces, links, other communication pathways, or any combination thereof, etc. Although illustrated by way of example as being separate from processing unit 704, memory device 706 may alternatively be provided as part of or otherwise co-located with or individually coupled to processing unit 704.

In certain example embodiments involving a computing platform or a special purpose computing device or components thereof, operations or processing may involve physical manipulation of physical quantities. Typically, although not necessarily, such quantities may take a form of electrical or magnetic signals (e.g., as represented by one or more binary digital signals) that are capable of being stored, transferred, combined, compared, transmitted, received, or otherwise manipulated. It has proven convenient at times, principally for reasons of common usage, to refer to such signals as bits, data, values, commands, memory content, elements, symbols, characters, variables, terms, numbers, numerals, or the like.

Also, the terms "and" or "or" as used herein may include a variety of meanings that are expected to depend at least in part on the context in which such terms are used. Typically, "or" if used to associate a list, such as A, B or C, is intended to mean A, B, and C, here used in an inclusive sense, as well as A, B or C, here used in an exclusive sense. Additionally, the term "one or more" as used herein may be used to describe any feature, structure, or characteristic in the singular or may be used to describe some combination of features, structures, or characteristics in the plural. However, it should be noted that this is merely an illustrative example and claimed subject matter is not limited to this example.

In the preceding description, various aspects of claimed subject matter have been described. For purposes of explanation, systems or configurations or methods were set forth to provide an understanding of claimed subject matter. However, claimed subject matter may be practiced without those specific details. In other instances, well-known features were omitted or simplified so as not to obscure claimed subject matter. Although certain features, structures, or characteristics, etc. have been illustrated or described herein, many modifications, substitutions, changes or equivalents will now occur to those skilled in the art. It is, therefore, to be understood that the appended claims are intended to cover all such modifications or changes as fall within claimed subject matter, and equivalents thereof.

What is claimed is:

1. A memory device comprising:
   an interface to receive at least one memory access command signal including at least one indicator signal that indicates a memory access type for an associated memory access operation, and a memory content signal of the associated memory access operation, the memory content signal containing information for subsequent storage in the memory device; and
   a controller configured to perform:
      a memory access boost operation;
      an operation for marking the memory content signal of the associated memory access operation; and
      an operation for classifying the memory content signal,
      wherein the controller is further configured to identify the memory access type of the at least one indicator signal of the at least one memory access command signal and to manage control signals based, at least in part, on the memory access type of the at least one indicator signal by:
         determining whether to initiate the memory access boost operation, the operation for marking the memory content signal of the associated memory access operation, or the operation for classifying the memory content signal of the associated memory access operation based, at least in part, on the memory access type of the at least one indicator signal, wherein determining comprises determining the memory access boost operation, the operation for marking the memory content signal of the associated memory access operation, and the operation for classifying the memory content signal of the associated memory access operation; and subsequently initiating the memory access boost operation, operation for marking the memory content signal of the associated memory access operation, or operation for classifying the memory content signal of the associated memory access operation; and the controller to perform the associated memory access operation with at least one memory array.

2. The memory device of claim 1, wherein the controller is further to manage the control signals to prepare the memory device to implement a random write process with the associated memory access operation.

3. The memory device of claim 1, wherein the controller is further to manage the control signals to prepare the memory device to implement a read access boost process with the associated memory access operation.

4. The memory device of claim 1, wherein the controller is further to manage the control signals to prepare the memory device to implement a secure write process with the associated memory access operation.

5. The memory device of claim 4, wherein the controller is further to prepare the memory device to perform the associated memory access operation at one or more locations of the at least one memory array, with the one or more locations corresponding to storage for secure memory content signals.

6. The memory device of claim 1, wherein the controller is further to manage the control signals to prepare the memory device to perform the associated memory access operation with memory content signals that are associated with a classification.

7. The memory device of claim 1, wherein the at least one memory access command signal further includes at least one reliable write signal that is adjacent to the at least one indicator signal that indicates the memory access type for the associated memory access operation.

8. A device comprising:
an interface to receive at least one memory access command signal including at least one indicator signal that indicates a memory access type for an associated memory access operation, and a memory content signal of the associated memory access operation, the memory content signal containing information for subsequent storage in the device; and
a controller configured to perform:
a memory access boost operation;
an operation for marking the memory content signal of the associated memory access operation; and
an operation for classifying the memory content signal, wherein the controller is further configured to identify the memory access type of the at least one indicator signal of the at least one memory access command signal and to perform the associated memory access operation with at least one memory array; and the controller to:
determine whether to initiate the memory access boost operation, the operation for marking the memory content signal of the associated memory access operation, or the operation for classifying the memory content signal of the associated memory access operation based, at least in part, on the memory access type of the at least one indicator signal, wherein determining comprises determining the memory access boost operation, the operation for marking the memory content signal of the associated memory access operation, and the operation for classifying the memory content signal of the associated memory access operation; and subsequently initiate the memory access boost operation, operation for marking the memory content signal of the associated memory access operation, or operation for classifying the memory content signal of the associated memory access operation.

9. The device of claim 8, wherein the at least one indicator signal that indicate the memory access type for the associated memory access operation informs the controller at least one of: at least one memory access feature that the device is expected to provide with regard to performance of the associated memory access operation or at least one characteristic corresponding to memory content signals that correspond to the associated memory access operation.

10. The device of claim 8, wherein the controller comprises a command decoder to decode the at least one memory access command signal and to extract the at least one indicator signal from the at least one memory access command signal.

11. The device of claim 8, wherein the controller comprises a memory access operation manager to translate at least part of the memory access command signal into a sequence of command signals, the memory access operation manager to issue the sequence of command signals to the at least one memory array to cause the associated memory access operation to be performed in accordance with at least one of the memory access boost operation, the operation for marking a memory content signal of the associated memory access operation, and the operation for classifying the memory content signal of the associated memory access operation.

12. The device of claim 8, further comprising:
the at least one memory array operatively coupled to the controller, the at least one memory array to store memory content signals responsive to command signals issued by the controller.

13. The device of claim 12, wherein at least part of the at least one memory array is partitioned into multiple portions; and wherein different portions of the multiple portions correspond to different classifications of memory content signals.

14. The device of claim 8, wherein the at least one indicator signal comprises at least part of one or more argument field signals of the at least one memory access command signal.

15. The device of claim 14, wherein the at least one memory access command signal comprises 48 binary digital signals, and the at least one indicator signal comprises a binary digital signal range of [38:24] of the 48 binary digital signals.

16. The device of claim 8, wherein the at least one memory access command signal is embedded within at least one memory access communication signal that contains one or more memory content signals.

17. A method comprising:
receiving at least one memory access command signal that includes at least one indicator signal that indicates a memory access type for an associated memory access operation;

receiving a memory content signal of the associated memory access operation, the memory content signal containing information for subsequent storage in a memory device;

decoding the at least one memory access command signal to identify the memory access type of the at least one indicator signal for the associated memory access operation;

evaluating whether to initiate a memory access boost operation, an operation for marking the memory content signal of the associated memory access operation, or an operation for classifying the memory content signal of the associated memory access operation based, at least in part, on the memory access type of the at least one indicator signal, wherein evaluating comprises evaluating the memory access boost operation, the operation for marking the memory content signal of the associated memory access operation, and the operation for classifying the memory content signal of the associated memory access operation; and subsequently initiating the memory access boost operation, operation for marking the memory content signal of the associated memory access operation, or operation for classifying the memory content signal of the associated memory access operation.

18. The method of claim 17, wherein said receiving further comprises receiving at a memory device the at least one memory access command signal from a host; and wherein the method further comprises:

providing from the memory device a response to the host to confirm that the at least one memory access command signal has been received at the memory device or to confirm that the associated memory access operation has been performed in accordance with the memory access type of the at least one indicator signal.

19. The method of claim 17, wherein said initiating comprises:

preparing to mark memory content signals, which correspond to the associated memory access operation, as being designated to be securely purged in lieu of erased in accordance with the memory access type of the at least one indicator signal.

20. The method of claim 17, wherein said initiating comprises:

preparing to store memory content signals, which correspond to the associated memory access operation, in at least one portion of a memory array, the at least one portion of the memory array corresponding to a particular performance level in accordance with the memory access type of the at least one indicator signal.

21. The method of claim 17, wherein said initiating comprises:

preparing to expedite performance of the associated memory access operation with a memory array in accordance with the memory access type of the at least one indicator signal.

22. A system comprising:

at least one memory device comprising:

an interface to receive at least one memory access command signal including at least one indicator signal that indicates a memory access type for an associated memory access operation, and a memory content signal of the associated memory access operation, the memory content signal containing information for subsequent storage in the memory device; and a controller configured to perform:

a memory access boost operation;

an operation for marking the memory content signal of the associated memory access operation; and an operation for classifying the memory content signal, wherein the controller is further configured to identify the memory access type of the at least one indicator signal of the at least one memory access command signal and to manage control signals based, at least in part, on the memory access type of the at least one indicator signal to:

determine whether to initiate the memory access boost operation, the operation for marking the memory content signal of the associated memory access operation, or the operation for classifying the memory content signal of the associated memory access operation based, at least in part, on the memory access type of the at least one indicator signal, wherein determining comprises determining the memory access boost operation, the operation for marking the memory content signal of the associated memory access operation, and the operation for classifying the memory content signal of the associated memory access operation; and subsequently initiate the memory access boost operation, operation for marking the memory content signal of the associated memory access operation, or operation for classifying the memory content signal of the associated memory access operation; and one or more processing units to host one or more applications and to initiate provision of memory access command signals to the interface to enable access to the at least one memory device.

23. The system of claim 22, wherein the system comprises a mobile device, and the at least one memory device further comprises a memory array; and wherein at least part of the memory array is partitioned into at least a first portion and a second portion, the first portion having a relatively higher performance than the second portion, and the second portion having a relatively higher density than the first portion.

24. A memory device comprising:

an interface to receive at least one memory access command signal including at least one indicator signal that indicates a memory access type for an associated memory access operation, the at least one indicator signal comprising 15 binary digital signals, and to receive a memory content signal of the associated memory access operation, the memory content signal containing information for subsequent storage in the memory device; and a controller configured to perform:

a memory access boost operation;

an operation for marking the memory content signal of the associated memory access operation; and an operation for classifying the memory content signal, wherein the controller is further configured to identify the memory access type of the at least one indicator signal of the at least one memory access command signal and to manage control signals based, at least in part, on the memory access type of the at least one indicator signal by:

determining whether to initiate the memory access boost operation, the operation for marking the memory content signal of the associated memory access operation, or the operation for classifying the memory content signal of the associated memory access operation based, at least in part, on the memory access type of the at least one indicator signal, wherein determining comprises determining the memory access boost operation, the operation for marking the memory content signal of the associated memory access operation, and the operation for classifying the memory content signal of the associated memory access operation; and subsequently initiating the memory access boost operation, operation for marking the memory content signal of the associated memory access operation, or operation for classifying the memory content signal of the associated memory access operation.

25. The memory device of claim 24, wherein the controller is further to initiate a memory access protocol to prepare the memory device to perform the associated memory access operation; wherein the at least one memory access command signal comprises 48 binary digital signals; and wherein the 15 binary digital signals of the at least one indicator signal are adjacent to at least one reliable write signal of the at least one memory access command signal.

26. The device of claim 1, wherein the operation for marking the memory content signal comprises at least one of designating the memory content signal as being secure and designating the memory content signal as being for secure purging.

27. The device of claim 1, wherein the operation for classifying the memory content signal is configured to provide a classification for the memory content signal, and wherein the controller is configured to select a memory location for storing the memory content signal based, at least in part, on the classification of the memory content signal.

* * * * *